(12) United States Patent
Raetzsch et al.

(10) Patent No.: US 6,339,123 B1
(45) Date of Patent: Jan. 15, 2002

(54) HETEROPHASIC POLYOLEFIN ALLOY

(75) Inventors: Manfred Raetzsch, Kirchschlag; Norbert Reichelt, Neuhofen; Achim Hesse, Linz, all of (AT); Hans-Gerhard Fritz, Uhingen; Uwe Bölz, Muehlacker, both of (DE)

(73) Assignee: Borealis GmbH, Schwechat-Mannswoerth (AT)

( * ) Notice: Subject to any disclaimer, the term of this patent is extended or adjusted under 35 U.S.C. 154(b) by 0 days.

(21) Appl. No.: 09/345,145

(22) Filed: Jun. 30, 1999

(30) Foreign Application Priority Data

Jul. 13, 1998 (DE) ......................................... 198 31 278

(51) Int. Cl.$^7$ ................................................. C08J 3/02
(52) U.S. Cl. ......................... 524/521; 524/525; 525/72
(58) Field of Search .............................. 524/525, 521; 525/72

(56) References Cited

U.S. PATENT DOCUMENTS

| | | | |
|---|---|---|---|
| 3,646,155 A | | 2/1972 | Scott et al. |
| 3,860,542 A | * | 1/1974 | Sakaguchi ..................... 260/23 |
| 4,141,878 A | | 2/1979 | Coran et al. |
| 5,206,294 A | * | 4/1993 | Dawson ........................ 525/196 |
| 5,721,314 A | * | 2/1998 | Hausmann ..................... 525/71 |
| 5,741,858 A | * | 4/1998 | Brann .......................... 525/101 |
| 5,747,164 A | * | 5/1998 | Miyakawa ................ 428/411.1 |
| 5,861,463 A | * | 1/1999 | Sehanobish ................. 525/240 |
| 5,962,594 A | * | 10/1999 | Raetzsch ..................... 525/285 |
| 6,037,418 A | * | 3/2000 | Mukai ......................... 525/242 |

FOREIGN PATENT DOCUMENTS

| | | |
|---|---|---|
| DE | 2611491 | 9/1976 |
| DE | 2620820 | 11/1976 |
| DE | 2830160 | 1/1979 |
| EP | 0614940 | 4/1989 |
| EP | 0334829 | 9/1989 |
| EP | 0336780 | 10/1989 |
| EP | 0376213 | 7/1990 |
| EP | 0409542 | 1/1991 |
| EP | 0475307 | 3/1992 |
| EP | 0547843 | 6/1993 |
| EP | 0672712 | 9/1995 |
| EP | 0769525 | 4/1997 |
| GB | 1406680 | 9/1975 |
| JP | 8-301927 | 11/1996 |

OTHER PUBLICATIONS

Rubber Chemistry and Technology—"Rubber–Thermoplastic Compositions. Part IV. Thermoplastic Vulcanizates from Various Rubber–Plastic Combinations" by A.Y. Coran et al., pp. 892–903.

Morphology in Polyolefin Ternary Blends—"Particles versus Fibrillar Morphology in Polyolefin Ternary Blends" by B. K. Kim et al., pp. 2207–2218.

Deformation and Fracture Processes of Two PPs—"Relationship between Morphology and Micromechanical Toughening Mechanisms in Modified Polypropylenes" by G.–M Kim et al., pp. 1391–1403.

Binary Blends of i–PP/Ethylene–1–Hexene Copolymer—"Rheological Properties for Binary Blends of i–PP and Ethylene–1–hexene Copolymer" by Masayuki Yamaguchi et al., pp. 467–474.

Plastic Film & Sheeting 10 (1994)—"Polyolefin Modification with Exact™ Plastomers" by T.C. Yu et al., pp. 539–564.

Polypropylene Handbook—Polymerization, Characterization, Properties, Processing, Applications by Edward P. Moore, Jr., pp. 218–225 (1996).

Makromol. Chem., Macromol. Symp. 53, 173–189 (1992) by E.N. Kresge et al., pp. 173–189.

Antec '94—"Impact Modification of Polypropylenes with Exact™ Plastomers" by T.C. Yu, pp. 2439–2442.

Antec '96—"Preparation of Metallocene Plastomer Modified High Flow Thermoplastic Olefins" by Thomas C. Yu et al., pp. 1995–2000.

Macromolecules 1989, vol. 22, No. 10, pp. 3851–3858—"Elastomeric Polypropylenes from Alumina–Supported Tetraalkyl Group IVB Catalysts. 1. Synthesis and Properties of High Molecular Weight Stereoblock Homopolymers" by John W. Collette et al.

Makromol. Chem. 189, pp. 815–821 (1988)—"Physical behaviour of stereoblock–isotactic polypropylene" by F. de Candia et al.

"Die Angewandte Makromolekulare Chemie" by Friedrich Kloos, 185/186 (1991) pp. 97–108.

Kautschuk—Gummi—Kunststoffe 49 (1996) 12, pp. 812–813.

W. Michaeli, Z. Kunstoffberater (1990) 3, pp. 38–43.

* cited by examiner

*Primary Examiner*—Paul R. Michl
(74) *Attorney, Agent, or Firm*—Jordan and Hamburg LLP

(57) ABSTRACT

Heterophasic polyolefin alloys, with a semi-interpenetrating network structure and an outstanding combination of high stiffness, low temperature toughness and optionally a low coefficient of thermal expansion of propylene polymers and elastomers, are produced by melt compounding propylene polymers with a co-continuous blend, which contains 5 to 60% by weight of gel and was produced by reacting mixtures of propylene polymers and elastomeric polyolefins or styrene butadiene ethylene terpolymers with ethylenically unsaturated, hydrolyzable organosilane compounds in the presence of silanol condensation catalysts.

Heterophasic polyolefin alloys are suitable for the production of films, sheets, fibers, panels, coatings, injection molded article, pipes, hollow objects and foams.

18 Claims, No Drawings

HETEROPHASIC POLYOLEFIN ALLOY

BACKGROUND OF THE INVENTION

The invention relates to heterophasic polyolefin alloys with a semi-interpenetrating network structure and an outstanding combination of high stiffness and low temperature toughness and optionally with a low coefficient of thermal expansion, consisting of propylene polymers and modified elastomers, which are suitable for the manufacture of films, sheets, fibers, panels, coatings, injection molded articles, pipes, hollow objects and foams. The invention also relates to a method for producing these heterophasic polyolefin alloys.

Thermoplastic elastomers, as heterophasic polyolefin alloys of high toughness, are known. Known elastomeric components for thermoplastic elastomers based on polypropylene are ethylene propylene elastomers (EP 672 712; EP 614 940), ethylene propylene diene elastomers (EP 547 843; EP 409 542), ethylene vinyl acetate copolymers (BE 899507; Coran, A., Rubber Chem. Technol. 54 (1981), 892), chlorosulfonated polyethylene (U.S. Pat. No. 4,141,878), elastomeric copolymers of ethylene and $C_4$ to $C_8$ olefins, such as elastomeric ethylene butene copolymers (Kautschuk-Gummi-Kunststoffe 49 (1996) 12, 812–813), ethylene hexene copolymers or ethylene octene copolymers (Yu, T. J. Plastic Film and Sheeting 10 (1994) 1, 539–564), as well as elastomeric atactic polypropylenes (EP:334–829) in amounts of 35 to 70% by weight, based on the polyolefin mixture.

The composition of the polyolefin components and of the elastomeric components and the distribution of the elastomeric components in the polyolefin component are of decisive significance for the material properties of heterophasic polyolefin alloys with elastomers, such as strength and elasticity (Moore, P., Polypropylene Handbook, Carl Hanser-Verlag Munich 1996, 218 to 225).

It is furthermore known that the elastomeric components in polyolefin alloys, which are based on polypropylene/ethylene propylene diene elastomers, can be vulcanized by additions, such as dodecyl mercaptan (DE 26 20 820), sulfur (EP 336 780) or tetrabutyl thiuram disulfide (EP 376 213). However, these formulations have the disadvantage of discoloring severely, so that semi-finished and molded products of these materials can be used only if they are dyed black.

Heterophasic polyolefin alloys based on polypropylene and elastomeric $C_4$ to $C_8$ olefins can be dyed particularly well. However, compared to heterophasic polyolefin alloys based on polypropylenes and vulcanized ethylene propylene diene elastomers, they have a significantly lower strength level.

For formulations from polypropylenes and elastomeric ethylene hexene copolymers, it is known that the blends can be modified by electron beam radiation (JP 96 301 927).

Furthermore, grafting of polyethylene as well as of ethylene copolymers with ethylenically unsaturated hydrolyzable organosilane compounds and the hydrolytic cross linking of these grafted copolymers is known (German patent 26 11 491; U.S. Pat. No. 3,646,155; British patent 1,406,680).

It is also known that the impact strength of polypropylenes can be modified by the addition of 10 to 35% by weight of amorphous ethylene propylene diene elastomers (Michaeli, W., Z. Kunststoffberater (1990) 3, 38–43; Kloos, F., Angewandte Makromolekulare Chemie 185/186 (1991), 97–108), ethylene propylene elastomers (Kim, B., J. Applied Polymer Science 60 (1996), 2207–2218, J. Applied Polymer Science 60 (1996), 1391–1403), likewise in the form of reactor blends of polypropylene and ethylene and ethylene propylene rubber (Kresge, E., Macromol. Symp. 53 (1992), 173–189, Schwager, H. Kunststoffe 82 (1992) 6, 499–501), ethylene butene elastomers (Yu, C., SPE-ANTEC 94, 2439–2442, SPE-ANTEC '96, 1995–2000), ethylene hexene copolymers (J 08 301 927, Yamaguchi, M., J. Applied Polymer Science 63 (1997), 467–474) and ethylene octene elastomers (EP 0 769 525, J 97 48 920).

DETAILED DESCRIPTION OF THE INVENTION

The object of the invention is to form heterophasic polyolefin alloys from propylene polymers and elastomers, which have a high stiffness, a low temperature toughness and optionally a low coefficient of thermal expansion.

Surprisingly, it was found that, by melt compounding partially cross linked blends, which were synthesized by the reaction of elastomeric polyolefins or styrene ethylene butadiene terpolymers or of mixtures of propylene polymers and elastomeric polyolefins or styrene ethylene butadiene terpolymers with ethylenically unsaturated, hydrolyzable organosilane compounds in the presence of free radical-forming agents and silanol condensation catalysts, with an excess of propylene polymers, heterophasic polyolefin alloys with a semi-interpenetrating network structure can be produced, which fulfill these requirements. At the same time, it was observed that the partially cross linked elastomeric polyolefins formed are distributed homogeneously in the polypropylene matrix as extended, filamentous network structures.

The objective of the invention was accomplished by heterophasic polyolefin alloys with a semi-interpenetrating network structure and an outstanding combination of high stiffness, low temperature toughness and optionally a low coefficient of thermal expansion, which consists of 65 to 99.6% by weight of propylene polymers and 35 to 0.4% by weight of elastomeric polyolefins or styrene ethylene butadiene terpolymers and optionally 0.01 to 2.5% by weight of stabilizers, 0.01 to 1% by weight of processing aids, 0.1 to 1% by weight of antistatic agents, 0.2 to 3% by weight of pigments, 0.05 to 1% by weight of nucleating agents and/or 2 to 20% by weight of flame retardants, in each case based on the sum of the polymers, as auxiliary materials, and/or optionally 10 to 70% by weight and preferably 20 to 50% by weight, based on the sum of the polymers, of inorganic and/or organic fillers and/or reinforcing materials, the heterophasic polyolefin alloys, pursuant to the invention, having a gel content of $$G_{HP}=10^{-2}C_B(G_B+N(100-G_B)).$$

wherein
- $G_{HP}$=gel portion of the heterophasic polyolefin alloys in % by weight
- $C_B$=Concentration of the co-continuous blend B in the polyolefin alloy in % by weight
- $G_B$=gel portion of the co-continuous blend B in % by weight
- N=post cross linking factor=0.10 to 0.90 and being prepared by melt compounding 60 to 98% by weight of conventional propylene homopolymers or propylene copolymers A with melt indexes ranging from 0.1 to 50 g/10 minutes at 230° C./2.16 kg with 40 to 2% by weight of a co-continuous blend B, optionally with the addition of 0.01 to 0.5% by weight of silanol condensation catalysts and/or 0.01 to 0.5% of water, and wherein the co-continuous blends B on the basis of
  B1) conventional propylene polymers or propylene copolymers with melt indexes ranging from 0.1 to 50 g/10 minutes at 230° C./2.16 kg,
which are present in the mixture in an amount of 20 to 90% by weight of the elastomeric polyolefins or elastomeric styrene ethylene butadiene terpolymers
  B2) olefin copolymers of 50 to 95% by weight of ethylene and 50 to 5% by weight of propylene and/or α-olefins with 4 to 18 carbon atoms and/or ethylenically unsaturated carboxylate esters of the vinyl acetate type and/or $C_1$ to $C_8$ alkyl (meth)acrylates with melt indexes of 0.2 to 30 g/10 minutes at 190° C./2.16 kg, and/or
  B3) largely amorphous polypropylenes or propylene copolymers with a crystalline polypropylenes or crystalline propylene copolymers content of less than 10% by weight, an enthalpy of melting of less than 40 J/g and a melt index of 0.1 to 40 g/10 minutes at 230° C./2.16 kg, the elastomeric, largely amorphous polypropylene being a homopolymer of propylene and/or a copolymer of propylene of at least 80 mole percent propylene and not more than 20 mole percent of one or more α-olefins of the general formula $CH_2=CHR$, wherein R is a linear or branched alkyl group with 2 to 8 carbon atoms, and/or
  B4) non-isotactic propylene homopolymers with a melting point of 145° to 165° C., a melt viscosity of more than 200,000 g/m/sec at 190° C., a heat of crystallization of 4 to 10 cal/g and a solubility in diethyl ether of 35% by weight to 55% by weight, and/or
  B5) linear styrene ethylene / butadiene styrene triblock copolymers with an ethylene content of 5 to 45% by weight and a styrene content of 15 to 45% by weight and a melt index of 0.2 to 30 g/10 minutes at 190° C./2.16 kg,
the co-continuous blends containing 0.1 to 5.0% by weight of chemically bound, ethylenically unsaturated, hydrolyzable organosilane compounds and 5 to 60% by weight and preferably 25 to 50% by weight of gel, are synthesized
1) either by the reaction of mixtures of 10 to 80% by weight of conventional propylene homopolymers or propylene copolymers and 90 to 20% by weight of elastomeric polyolefins or styrene ethylene butadiene terpolymers with 0.1 to 5.0% by weight of ethylenically unsaturated hydrolyzable organosilane compounds in the presence of 0.01 to 1.0% by weight of thermally decomposing free radical-forming agents with half-life times of 1 minute to 48 hours at 130° C., 0.01 to 1.0% by weight of silanol condensation catalysts and optionally 0.01 to 1.0% by weight of water, in each case based on the elastomeric polyolefins or styrene ethylene butadiene terpolymers in the melt,
2) or by the reaction of mixtures of 6 to 66% by weight of conventional propylene homopolymers or propylene copolymers and 94 to 33% by weight of elastomeric polyolefins or of styrene ethylene butadiene terpolymers with 0.1 to 5.0% by weight, based on the elastomeric polyolefins or on the styrene ethylene butadiene terpolymers of ethylenically unsaturated, hydrolyzable organosilane compounds in the presence of 0.01 to 1.0% by weight, based on the elastomeric polyolefins or on the styrene ethylene butadiene terpolymers, of thermally decomposing free radical-forming agents in the melt and the addition of a further 5 to 40% by weight, based on the polymer mixture, of conventional propylene homopolymers or propylene copolymers, and 0.01 to 1.0% by weight of silanol condensation catalysts and optionally 0.01 to 1.0% by weight of water, based in each case on the elastomeric polyolefins or styrene ethylene butadiene terpolymers, in the melt,
3) or by the reaction of elastomeric polyolefins or styrene ethylene butadiene terpolymers with 0.1 to 5.0% by weight of ethylenically, unsaturated, hydrolyzable organosilane compounds in the presence of 0.01 to 1.0% by weight, based on the elastomeric polyolefins or the styrene ethylene butadiene terpolymers, of thermally decomposing free radical-forming agents in the melt, followed by granulation and subsequently by melt compounding of mixtures of 90 to 20% by weight of these, modified, elastomeric polyolefins or styrene ethylene butadiene terpolymers and 10 to 80% by weight of conventional propylene homopolymers or propylene copolymers in the presence of 0.01 to 1.0% by weight of silanol condensation catalysts and optionally of 0.01 to 1.0% of water, based in each case on the elastomeric polyolefins or the styrene ethylene butadiene terpolymers,
and whereby the conventional propylene homopolymers or propylene copolymers A and the conventional propylene homopolymers or propylene copolymers B1) can be the same or different.

Preferably, as conventional propylene homopolymers or propylene copolymers A or B1), propylene homopolymers and/or copolymers of propylene, ethylene and/or α-olefins with 4 to 18 carbon atoms and having a propylene content of 80.0 to 99.9% by weight, synthesized using Ziegler-Natta catalysts or metallocene catalysts in the form of random copolymers, block copolymers and/or random block copolymers with melt indexes of 0.1 to 50 g/10 minutes at 230° C./2.16 kg and preferably of 0.2 to 15 g/10 minutes at 230° C./2.16 kg are used. Particularly suitable for this purpose are propylene homopolymers, which have a bimodal distribution of molecular weights, weight average molecular weights $M_W$ of 500,000 to 1,500,000 g/mole, number average molecular weights $M_n$ 25,000 to 100,000 g/mole and $M_w/M_n$ values of 2 to 60 and were produced in a reactor cascade.

The largely amorphous polypropylenes or propylene copolymers B3), used for the synthesis of the co-continuous blends B are, in particular, stereo-block polypropylenes, which are synthesized, for example, using highly active metal oxide-fixed Ziegler-Natta catalysts (Collette, J., Macromolecules 22 (1989), 3851–3858, DE 28301601) or soluble Ziegler-Natta catalysts (de Candia, F., Makromol. Chem. 189(1988) 815–821), optionally with subsequent modification of the reactivity and/or degradation.

The non-isotactic propylene homopolymers B4), used for the synthesis of the co-continuous blends B, are products described in EP 475 307.

The ethylenically unsaturated, hydrolyzable organosilane compounds, present chemically bound in the co-continuous blends B, preferably are $C_3$ to $C_8$ alkenyl $C_1$ to $C_2$ alkoxy silanes, $C_2$ to $C_{14}$ alkenylhalogensilanes, amino $C_2$ to $C_5$ alkenylsilanes, $C_6$ to $C_8$ cycloalkenylsilanes, methacryloxy $C_1$ to $C_3$ alkylsilanes, styryl $C_1$ to $C_2$ alkoxysilanes, vinyl $C_1$ to $C_4$ alkoxysilanes and/or vinyl $C_1$ to $C_8$ carboxysilanes and especially vinyltrimethoxysilane and/or vinyltriethoxysilane.

The proportions of gel in the co-continuous blends B or the heterophasic polyolefin alloys was determined following the method of DIN 53 738 by extracting for 16 hours with hot xylene.

After a sample was taken from the middle region of the tensile test piece, the coefficient of thermal, longitudinal expansion was determined in each case along and at right angles to the injection direction. The experimental parameters were as follows: temperature 5° to 95° C., sample length about 7 mm, heating rate 3° K./min, contacting force 0.02 N, contacting pressure 0.02 N/mm, flushing gas nitrogen.

The auxiliary materials, optionally contained in the heterophasic polyolefin alloys are 0.01 to 2.5% by weight of stabilizers, 0.1 to 1% by weight of antistatic agents, 0.2 to 3% by weight of pigments, 0.05 to 1% by weight of nucleating agents and/or 2 to 20% by weight of flame retardants, in each case based on the polyolefins used.

As stabilizers in the heterophasic polyolefin alloys, preferably mixtures of 0.01% to 0.6% by weight of phenolic antioxidants, 0.01% to 0.6% by weight of processing stabilizers based onphosphites, 0.01% to 0.6% by weight of 3-arylbenzofuranone derivatives, 0.01% to 0.6% by weight of high temperature stabilizers based on disulfides and thioethers and/or 0.01% to 0.8% by weight of sterically hindered amines (HALS), in each case based on the polyolefins used, may be contained.

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenyl) propionate, 1,3,5-trimethyl-2,4,6-tris(3',5'-di-t-butyl-4-hydroxybenzyl)benzene and/or pentaerythritol-tetrakis(3-(3,5-di-t-butyl- 4-hydroxyphenyl)) propionate.

As HALS compounds, bis-2,2,6,6-tetramethyl-4-piperidyl sebacate and/or poly-((1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)-imino) are particularly suitable.

As processing aids, the heterophasic polyolefin alloys may preferably contain calcium stearate, magnesium stearate and/or waxes.

As nucleating agents, the heterophasic polyolefin alloys preferably may contain α-nucleating agents, such as talcum or the sodium salt of methylene-bis(2,4-di-t-butylphenol) phosphoric acid or β-nucleating agents, such as the dianilide of adipic acid, dibenzoquinacridone or N,N'-dicyclohexyl-2,6-naphthalene dicarboxamide.

The fillers, optionally contained in the heterophasic polyolefin alloys, preferably are $Al_2O_3$, $Al(OH)_3$, barium sulfate, calcium carbonate, glass spheres, wood flour, silica, hollow microspheres, carbon black, talcum and/or wollastonite.

The reinforcing materials, optionally contained in the heterophasic polyolefin alloys, preferably are aramide fibers, cellulose fibers, flax, jute, kenaf, glass fibers, glass mats, microfibers of liquid crystalline polymers and/or polytetrafluoroethylene fibers.

The heterophasic polyolefin alloys, with a semi-interpenetrating network structure and an outstanding combination of high stiffness, low temperature toughness and optionally a low coefficient of thermal expansion, of 65 to 99.6% by weight of propylene-polymers and 35 to 0.4% by weight of elastomeric polyolefins or styrene ethylene butadiene terpolymers and optionally 0.05 to 25% by weight of auxiliary materials and/or 10 to 70% by weight, in each case based on the sum of the polymers, of fillers and/or reinforcing materials are produced pursuant to the invention by melt compounding, 60 to 98% by weight of conventional propylene homopolymers or propylene copolymers A with 40 to 2% by weight of a co-continuous blend B, optionally with addition of 0.01 to 0.5% by weight of silanol condensation catalysts and/or 0.01 to 0.5% by weight of water, preferably with the continuous addition or propylene homopolymers or propylene copolymers to the co-continuous blends B, at temperatures of 120° to 270° C. and preferably of 200° to 240° C., wherein the co-continuous blends B on the basis of B1) conventional propylene homopolymers or propylene copolymers with melt indexes ranging from 0.1 to 50 g/10 minutes at 230° C./2.16 kg, which are present in the mixture with 20 to 90% by weight of the elastomeric polyolefins or elastomeric styrene ethylene butadiene terpolymers, B2) olefin copolymers of 50 to 95% by weight of ethylene and 50 to 5% by weight of propylene and/or α-olefins with 4 to 18 carbon atoms and/or ethylenically unsaturated carboxylate esters of the vinyl acetate type and/or $C_1$ to $C_8$ alkyl (meth)acrylates with melt indexes of 0.2 to 30 g/10 minutes at 190° C./2.16 kg, and/or B3) largely amorphous polypropylenes or propylene copolymers with a crystalline polypropylenes or crystalline propylene copolymers content of less than 10% by weight, an enthalpy of melting of less than 40 J/g and a melt index of 0.1 to 40 g/10 minutes at 230° C./2.16 kg, the elastomeric, largely amorphous polypropylene being a homopolymer of propylene and/or a copolymer of propylene of at least 80 mole percent propylene and not more than 20 mole percent of one or more α-olefins of the general formula $CH_2=CHR$, wherein R is a linear or branched alkyl group with 2 to 8 carbon atoms, and/or B4) non-isotactic propylene homopolymers with a melting point of 145° to 165° C., a melt viscosity of 200,000 g/m/sec at 190° C., a heat of crystallization of 4 to 10 cal/g and a solubility in diethyl ether of 35% by weight to 55% by weight, and/or B5) linear styrene ethylene/butadiene styrene triblock copolymers with an ethylene content of 5 to 45% by weight and a styrene content of 15 to 45% by weight and a melt index of 0.2 to 30 g/10 minutes at 190° C./2.16 kg, 1) either by the reaction of mixtures of 10 to 80% by weight of conventional propylene homopolymers or propylene copolymers and 90 to 20% by weight of elastomeric polyolefins or styrene ethylene butadiene terpolymers with 0.1 to 5.0% by weight of ethylenically unsaturated hydrolyzable organosilane compounds in the presence of 0.01 to 1.0% by weight of thermally decomposing free radical-forming agents with half-life times of 1 minute to 48 hours at 130° C., 0.01 to 1.0% by weight of silanol condensation catalysts and optionally 0.01 to 1.0% by weight of water, in each case based on the elastomeric polyolefins or styrene ethylene butadiene terpolymers in continuous kneaders in the melt at temperatures of 120° to 270° C. and preferably of 200° to 240° C. and at pressures of 1 to 300 bar and preferably of 1 to 30 bar, at residence times of 0.5 to 40 minutes and preferably of 1 to 15 minutes, 2) or by the reaction of mixtures of 6 to 66% by weight of conventional propylene homopolymers or propylene copolymers and 94 to 33% by weight of elastomeric polyolefins or styrene ethylene butadiene terpolymers with 0.1 to 5.0% by weight, based on the elastomeric polyolefins or styrene ethylene butadiene terpolymers, of ethylenically unsaturated, hydrolyzable organosilane compounds in the presence of 0.01 to 1.0% by weight, based on the elastomeric polyolefins or styrene ethylene butadiene terpolymers, of thermally decomposing free radical-forming agents with half-life times of 1 minute to 48 hours at 130° C. in the melt and the addition of a further 5 to 40% by weight, based on the polymer mixture, of conventional propylene homopolymers or propylene copolymers, and 0.01 to 1.0% by weight of silanol condensation catalysts and optionally 0.01 to 1.0% by weight of water, in each case based on the elastomeric polyolefins or styrene ethylene butadiene terpolymers, in continuous kneaders in the melt at temperatures of 120° to 270° C. and preferably of 200° to 240° C. and at pressures of 1 to 300 bar and preferably of 1 to 30 bar, at residence times of 0.5 to 40 minutes and preferably of 1 to 15 minutes, 3) or by the reaction of elastomeric polyolefins or styrene ethylene butadiene terpolymers with 0.1 to 5.0% by weight of ethylenically unsaturated, hydrolyzable organosilane compounds in the presence of 0.01 to 1.0% by weight, based on the elastomeric polyolefins or the styrene ethylene butadiene terpolymers, of thermally decomposing free radical-forming agents with half-life times of 1 minute to 48 hours at 130° C. in continuous kneaders in the melt at temperatures of 120° to 270° C. and preferably of 200° to 240° C. and at pressures of 1 to 300 bar and preferably of 1 to 30 bar, at residence times of 0.5 to 40 minutes and preferably of 1 to 15 minutes, followed by granulation and subsequently by melt compounding of mixtures of 90 to 20% by weight of these modified, elastomeric polyolefins or styrene ethylene butadiene terpolymers and 10 to 80% by weight of conventional propylene homopolymers or propylene copolymers in the presence of 0.01 to 1.0% by weight of silanol condensation catalysts and optionally of 0.01 to 1.0% of water, based in each case on the elastomeric polyolefins or the styrene ethylene butadiene terpolymers, in continuous kneaders in the melt at temperatures of 120° to 270° C. and preferably of 200° to 240° C., 0.01 to 2.5% by weight of stabilizers, 0.01 to 1% by weight of processing aids, 0.1 to 1% by weight of antistatic agents, 0.2 to 3% by weight of pigments, 0.05 to 1% by weight of nucleating agents and 2 to 20% by weight of flame retardants, in each case based on the sum of the polymers, being added as auxiliary materials, and/or 10 to 70% by weight and preferably 20 to 50% by weight, based on the sum of the polymers, of inorganic and/or organic fillers and/or reinforcing agents being added during the preparation of the co-continuous blend B and/or during the subsequent production of the heterophasic polyolefin alloys, the conventional propylene homopolymers or propylene copolymers A and the conventional propylene homopolymers or propylene copolymers B1) being the same or different.

Preferably, single screw and twin-screw extruders, disk extruders and calenders are suitable as continuous kneaders.

Thermally decomposing free radical-forming agents preferably used for the preparation of co-continuous blends B, are peroxides, which have a half-life time of 30 seconds to 3 minutes at a temperature of 180° to 200° C., especially dicumyl peroxide, cumyl t-butyl peroxide, di-t-butyl peroxide and/or 2,5-dimethyl-2,5-(di-t-butyl peroxy)-hexane.

As silanol condensation catalysts for the production of co-continuous blends B and optionally of the heterophasic polyolefin alloys, preferably oxides, hydroxides and/or carboxylic acid salts of the metals tin, titanium, zinc, zirconium, iron, copper and/or lead are used, dibutyl tin dilaurate, dibutyl tin dioctoate and/or $C_1$ to $C_{12}$ dialkyl tin oxides being particularly preferred. During the production of the co-continuous blend B, the absorption of the silanol condensation catalysts brings about an excellent preliminary distribution of the thermally decomposing free radical-forming agent and of the ethylenically unsaturated hydrolyzable organosilane compounds.

A preferred method of adding the ethylenically unsaturated, hydrolyzable organosilane compounds, free radical-forming agents and silanol condensation catalysts used consists therein that these components are drummed in internal mixers, such as Röhnrad mixers, onto the elastomeric polyolefins or the styrene ethylene butadiene terpolymers.

The gel formation in the co-continuous blends can be accelerated by the addition of slight amounts of water, particularly by the addition of moistened polypropylene by side stream addition.

In a preferred variation of the method of producing heterophasic polyolefin blends, the production of the co-continuous blend B and the subsequent preparation of the heterophasic polyolefin alloys are carried out in an extruder cascade of 2 twin-screw extruders, particularly of tightly meshing twin-screw extruders rotating in the same direction, as a continuous kneader, in a first extruder, at mass temperatures of 190° to 250° C., mixtures of propylene homopolymers or propylene copolymers, elastomeric polyolefins or styrene ethylene butadiene terpolymers and ethylenically unsaturated, hydrolyzable organosilane compounds being reacted, the propylene homopolymers or propylene copolymers optionally being added to the co-continuous blend B as a side stream, and subsequently, in the second extruder, the heterophasic polyolefin alloys being produced by homogenizing the co-continuous blend B with an excess of propylene homopolymers or propylene copolymers, optionally with the addition of 0.01 to 0.5% by weight of silanol condensation catalysts and/or 0.01 to 0.5% by weight of water, at mass temperatures of 190° to 250° C. at high deformation speeds.

A further preferred variation of the method for producing heterophasic polyolefin alloys consists therein that the production of the co-continuous blends B and the subsequent production of the heterophasic polyolefin alloys is carried out in a twin-screw extruder with an L/D of 32 to 60 and preferably in a tightly meshing twin-screw extruder, rotating in the same direction, with an L/D of 40 to 60, the reaction of the mixtures of propylene homopolymers or propylene copolymers, elastomeric polyolefins or styrene ethylene butadiene terpolymers and ethylenically unsaturated, hydrolyzable organosilane compounds to the co-continuous blends B being carried out in the first 50 to 75% of the process length of the extruder components and the production of the heterophasic polyolefin alloys by homogenizing the co-continuous blends B with an excess of propylene homopolymers or propylene copolymers A, with side stream addition of the propylene homopolymers or the propylene copolymers A, optionally with the addition of 0.01 to 0.5% by weight of silanol condensation catalysts and/or 0.01 to 0.5% by weight of water, being carried out in the final 25 to 50% of the process length of the extruder components.

The heterophasic polyolefin alloys are suitable, in particular for the production of films, sheets, fibers, panels, coatings, injection molded articles, pipes, hollow objects and foams.

The invention is explained by means of the following Examples.

EXAMPLE 1

Preparation of the Co-Continuous Blend B

In the feeding funnel of a tightly meshing twin-screw extruder (Berstorff, ZE 25), rotating in the same direction, with a cooled drawing-in zone, vacuum degassing, an L/D of 48, a temperature profile of 190°/220°/240°/240°/240°/240°/240°/230°/220°/210°/200° C. and a rotational speed of 120 rpm, a polypropylene homopolymer (Daplen K2XMOD, with a melt index of 8.0 g/10 minutes at 230° C./2.16 kg, a density of 0.905 g/cc at 20° C.), at a rate of 1.05 kg/h, and an ethylene propylene copolymer (Exxon Vistalon 606, containing 48% ethylene and having a Mooney viscosity of 65 at 125° C.), to which, in the Röhnrad mixer, 2% by weight of vinyltrimethoxysilane, 0.075% by weight of dicumyl peroxide and 0.05% by weight of dibutyl tin dilaurate, in each case based on the ethylene propylene copolymer, are added at the rate of 2.45 kg/h, melted, homogenized, reacted with the vinylsilane contained in the reaction mixture, degassed, discharged at a melt temperature of 219° C. and granulated.

The resulting co-continuous blend B contains 1.65% by weight of bound vinyltrimethoxysilane and 58% by weight of gel.

Preparation of the Heterophasic Polyolefin Alloy

In the feeding funnel of a tightly meshing twin-screw extruder (Berstorff, ZE 25), rotating in the same direction, with a cooled drawing-in zone, vacuum degassing, an L/D of 48; a temperature profile of 190°/210°/230°/230°/230°/230°/220°/220°/210°/200°/190° C. and a rotational speed of 200 rpm, a polypropylene homopolymer (Daplen K2XMOD, with a melt index of 8.0 g/10 minutes at 230° C./2.16 kg, a density of 0.905 g/cc at 20° C.) at a rate of 2.8 kg/h, and a co-continuous blend B (containing 1.65% by weight of bound vinyltrimethoxysilane and 58% by weight of gel) at a rate of 1.2 kg/h, are added, homogenized at high deformation speeds, degassed, discharged at a melt temperature of 217° C. and granulated. The resulting heterophasic polyolefin alloy contains 20% of gel.

Test pieces, produced according to the instructions of DIN ISO 3167 A by injection molding, have the following properties:

Notch impact strength (Charpy) at −20° C.: 8.4 kJ/m$^2$
Tensile modulus of elasticity: 1370 MPa
Maximum tensile strength ($\sigma_{max}$): 25 MPa
Maximum extensibility ($\epsilon_{max}$): 75%
Coefficient of thermal longitudinal expansion α:
Sample taken in the injection direction: 94
Sample taken transversely to the injection direction: 167

EXAMPLE 2

Preparation of the Co-Continuous Blend B

In the feeding funnel of a tightly meshing twin-screw extruder (Berstorff, ZE 25), rotating in the same direction, with a cooled drawing-in zone, vacuum degassing, an L/D of 48, a temperature profile of 200°/215°/230°/240°/240°/240°/240°/230°/230°/220°/210° C. and a rotational speed of 120 rpm, a polypropylene homopolymer (Daplen BE 50, with a melt index of 0.25 g/10 minutes at 230° C./2.16 kg, a density of 0.905 g/cc at 20° C.), at a rate of 0.80 kg/h, and an ethylene propylene copolymer (Exxon Vistalon 606, containing 48% ethylene and having a Mooney viscosity of 65 at 125° C.), to which, in the Röhnrad mixer, 2% by weight of vinyltrimethoxysilane, 0.2% by weight of dicumyl peroxide and 0.25% by weight of dibutyl tin dilaurate, in each case based on the ethylene propylene copolymer, are added at the rate of 2.4 kg/h, melted, homogenized, reacted with the vinylsilane contained in the reaction mixture, degassed, discharged at a melt temperature of 227° C. and granulated.

The resulting co-continuous blend B contains 1.75% by weight of bound vinyltrimethoxysilane and 62% by weight of gel.

Preparation of the Heterophasic Polyolefin Alloy

In the feeding funnel of a tightly meshing twin-screw extruder (Berstorff, ZE 25), rotating in the same direction, with a cooled drawing-in zone, vacuum degassing, an L/D of 48, a temperature profile of 200°/215°/230°/240°/240°/240°/230°/230°/220°/210°/200° C. and a rotational speed of 230 rpm, a polypropylene homopolymer (Daplen K2XMOD, with a melt index of 8.0 g/10 minutes at 230° C./2.16 kg, a density of 0.905 g/cc at 20° C.) at a rate of 3.0 kg/h, and a co-continuous blend B (containing 1.75% by weight of bound vinyltrimethoxysilane and 62% by weight of gel) at a rate of 1.0 kg/h, are added, homogenized at high deformation speeds, degassed, discharged at a melt temperature of 220° C. and granulated. The resulting heterophasic polyolefin alloy contains 17.5% of gel.

Test pieces, produced according to the instructions of DIN ISO 3167 A by injection molding, have the following properties:

Notch impact strength (Charpy) at −20° C.: 10.2 kJ/m$^2$
Tensile modulus of elasticity: 1200 MPa
Maximum tensile strength ($\sigma_{max}$): 23.8 MPa
Maximum extensibility ($\epsilon_{max}$): 380%

EXAMPLE 3

Preparation of the Co-Continuous Blend B

In the feeding funnel of a tightly meshing twin-screw extruder (Berstorff, ZE 25), rotating in the same direction, with a cooled drawing-in zone, vacuum degassing, an L/D of 48, side stream addition at 30 D, a temperature profile of 190°/220°/240°/240°/240°/240°/240°/230°220°/210°/200° C. and a rotational speed of 120 rpm, an ethylene propylene copolymer Exxon Vistalon 606, containing 48% ethylene, having a Mooney viscosity of 65 at 125° C.), to which, in the Röhnrad mixer, 2% by weight of vinyltrimethoxysilane, 0.15% by weight of dicumyl peroxide and 0.30% by weight of dibutyl tin dilaurate, in each case based on the ethylene propylene copolymer, at the rate of 1.8 kg/h and a polypropylene homopolymer (Daplen K2XMOD, with a melt index of 8.0 g/10 minutes at 230° C./2.16 kg, a density of 0.905 g/cc at 20° C.) at a rate of 0.8 kg/h, are added, melted, homogenized, reacted with the vinylsilane contained in the reaction mixture, homogenized with polypropylene homopolymer (Daplen K2XMOD, with a melt index of 8.0 g/10 minutes at 230° C./2.16 kg, a density of 0.905 g/cc at 20° C.), added from a side stream at 30D, degassed, discharged at a melt temperature of 217° C. and granulated.

The resulting co-continuous blend B contains 1.8% by weight of bound vinyltrimethoxysilane and 65% by weight of gel.

Preparation of the Heterophasic Polyolefin Alloy

In the feeding funnel of a tightly meshing twin-screw extruder (Berstorff, ZE 25), rotating in the same direction, with a cooled drawing-in zone, vacuum degassing, an L/D of 48, a temperature profile of 190°/210°/230°/230°/230°/230°/ 220°/220°/210°/200°/190° C. and a rotational speed of 200 rpm, a polypropylene homopolymer (Daplen K2XMOD, with a melt index of 8.0 g/10 minutes at 230° C./2.16 kg, a density of 0.905 g/cc at 20° C.) at a rate of 2.9 kg/h, and a co-continuous blend B (containing 1.8% by weight of bound vinyltrimethoxysilane and 65% by weight of gel) at a rate of 2.4 kg/h, are added, homogenized at high deformation speeds, degassed, discharged at a melt temperature of 197° C. and granulated. The resulting heterophasic polyolefin alloy contains 31% of gel.

Test pieces, produced according to the instructions of DIN ISO 3167 A by injection molding, have the following properties:

Notch impact strength (Charpy) at −20° C.: 8.4 kJ/m$^2$
Tensile modulus of elasticity: 1350 MHa
Maximum tensile strength ($\sigma_{max}$) 22.4 MPa
Maximum extensibility ($\epsilon_{max}$): 190%

EXAMPLE 4

Preparation of the Co-Continuous Blend B

In the feeding funnel of a tightly meshing twin-screw extruder (Berstorff, ZE 25), rotating in the same direction, with a cooled drawing-in zone, vacuum degassing, an L/D of 48, side stream addition at 30 D, a temperature profile of 190°/220°/240°/240°/240°/240°/240°/230°/220° /210°/200° C. and a rotational speed of 150 rpm, an ethylene octene copolymer (Dow Engage 8200, containing 28% octene with a melt index of 5 g/10 minutes at 190° C./2.16 kg, a density of 0.870 g/cc), to which, in the Röhnrad mixer, 2% by weight of vinyltrimethoxysilane, 0.1% by weight of dicumyl peroxide and 0.20% by weight of dibutyl tin dilaurate, in each case based on the ethylene octene copolymer, at a rate of 1.8 kg/h, and a propylene homopolymer (Daplen K2XMOD, with a melt index of 8.0 g/10 minutes at 230° C./2.16 kg, a density of 0.905 g/cc at 25°) at 0.80 kg/h, are added, melted, homogenized, reacted with the vinylsilane contained in the reaction mixture, homogenized with the polypropylene homopolymer (Daplen K2XMOD, with a melt index of 8.0 g/10 minutes at 230° C./2.16 kg, a density of 0.905 g/cc at 20° C.) added by side stream addition at 30 D, degassed, discharged at a melt temperature of 217° C. and granulated.

The resulting co-continuous blend B contains 1.62% by weight of bound vinyltrirnethoxysilane and 57% by weight of gel.

Preparation of the Heterophasic Polyolefin Alloy

In the feeding funnel of a tightly meshing twin-screw extruder (Berstorff, ZE 25), rotating in the same direction, with a cooled drawing-in zone, vacuum degassing, an L/D of 48, a temperature profile of 190°/210°/230°/230°/230°/230°/ 220°/220°/210°/200°/190° C. and a rotational speed of 200 rpm, a polypropylene homopolymer (Daplen K2XMOD, with a melt index of 8.0 g/10 minutes at 230° C./2.16 kg, a density of 0.905 g/cc at 20° C.) at a rate of 4.0 kg/h, and a co-continuous blend B (containing 1.62% by weight of bound vinyltrimethoxysilane and 57% by weight of gel) at a rate of 1.8 kg/h, are added, homogenized at high deformation speeds, degassed, discharged at a melt temperature of 205° C. and granulated. The resulting heterophasic polyolefin alloy contains 21% of gel.

Test pieces, produced according to the instructions of DIN ISO 3167 A by injection molding, have the following properties:

Notch impact strength (Charpy) at −20° C.: 5.0 kJ/m$^2$
Tensile modulus of elasticity: 1680 MPa
Maximum tensile strength ($\sigma_{max}$): 28.8 MPa
Maximum extensibility ($\epsilon_{max}$): 96%
Coefficient of thermal longitudinal expansion α:
Sample taken in the injection direction: 90
Sample taken transversely to the injection direction: 164

EXAMPLE 5

Preparation of the Co-Continuous Blend B

In the feeding funnel of a tightly meshing twin-screw extruder (Berstorff, ZE 25), rotating in the same direction, with a cooled drawing-in zone, vacuum degassing, an L/D of 48, side stream addition at 30 D, a temperature profile of 190°/220°/240°/240°/240°/240°/240°/230°/220°/210°/200° C. and a rotational speed of 120 rpm, an ethylene propylene copolymer (Exxon Vistalon 606, containing 48% ethylene and having an Mooney viscosity of 65 at 125° C.), to which, in the Röhnrad mixer, 2% by weight of vinyltriethoxysilane, 0.15% by weight of di-t-butyl peroxide and 0.30% by weight of dibutyl tin dioctoate, in each case based on the ethylene propylene copolymer, at the rate of 1.8 kg/h, and a polypropylene homopolymer (Daplen K2XMOD, with a melt index of 8.0 g/10 minutes at 230° C./2.16 kg, a density of 0.905 g/cc at 20° C.), at a rate of 0.8 kg/h, are added, melted, homogenized, reacted with the vinylsilane contained in the reaction mixture, homogenized with the polypropylene homopolymer (Daplen K2XMOD, with a melt index of 8.0 g/10 minutes at 230° C./2.16 kg, a density of 0.905 g/cc at 20° C.), supplied by side stream addition at 30 D at the rate of 1.4 kg/h, degassed, discharged at a melt temperature of 219° C. and granulated.

The resulting co-continuous blend B contains 1.80% by weight of bound vinyltrimethoxysilane and 62% by weight of gel.

Preparation of the Heterophasic Polyolefin Alloy

In the feeding funnel of a tightly meshing twin-screw extruder (Berstorff, ZE 25), rotating in the same direction, with a cooled drawing-in zone, vacuum degassing, an L/D of 48, a temperature profile of 190°/210°/230°/230°/230°/230°/ 220°/220°/210°/200°/190° C. and a rotational speed of 200 rpm, a polypropylene homopolymer (Daplen K2XMOD, with a melt index of 8.0 g/10 minutes at 230° C./2.16 kg, a density of 0.905 g/cc at 20° C.), at a rate of 4.0 kg/h, and a co-continuous blend B (containing 1.80% by weight of bound vinyltrimethoxysilane and 62% by weight of gel), at a rate of 1.8 kg/h, are added, homogenized at high deformation speeds, degassed, discharged at a melt temperature of 205° C. and granulated. The resulting heterophasic polyolefin alloy contains 22% of gel.

Test pieces, produced according to the instructions of DIN ISO 3167 A by injection molding, have the following properties:

Notch impact strength (Charpy) at −20° C.: 6.8 kJ/m$^2$
Tensile modulus of elasticity: 1520 MPa
Maximum tensile strength ($\sigma_{max}$): 27.0 MPa
Maximum extensibility ($\epsilon_{max}$): 310%

EXAMPLE 6

Preparation of the Co-Continuous Blend B

In the feeding funnel of a tightly meshing twin-screw extruder (Berstorff, ZE 25), rotating in the same direction, with a cooled drawing-in zone, vacuum degassing, an L/D of 48, a temperature profile of 190°/220°/240°240°/240°/240°/240°/230°/220°/210°/200° C. and a rotational speed of 120 rpm, a polypropylene homopolymer (Daplen K2XMOD, with a melt index of 8.0 g/10 minutes at 230° C./2.16 kg, a density of 0.905 g/cc at 20° C.), at a rate of 1.05 kg/h, and an elastomeric polyolefin mixture of 70% by weight of a styrene ethylene/butadiene styrene triblock copolymer (with an $M_n$ of 83,700 g/mole, a styrene content of 29% by weight, an $M_w/M_n$ ratio of 1.04, a polybutadiene prepolymer with 40% 1,2 linkages and 60% 1,4 linkages) and a 30% by weight of an amorphous propylene homopolymer (with a melt index of 4.5 g/10 minutes at 230° C./2.16 kg, an enthalpy of melting of 38 J/g), to which, in the Röhnrad mixer, 1.5% by weight of vinyltriethoxysilane, 0.075% by weight of dicumyl peroxide and 0.05% by weight of dibutyl tin dilaurate, in each case based on the elastomeric polyolefin mixture, are added at the rate of 2.35 kg/h, melted, homogenized, reacted with the vinylsilane contained in the reaction mixture, degassed, discharged at a melt temperature of 215° C. and granulated.

The resulting co-continuous blend B contains 0.95% by weight of bound vinyltriethoxysilane and 55% by weight of gel.

Preparation of the Heterophasic Polyolefin Alloy

In the feeding funnel of a tightly meshing twin-screw extruder (Berstorff, ZE 25), rotating in the same direction, with a cooled drawing-in zone, vacuum degassing, an L/D of 48, a temperature profile of 190°/210°/230 /230°/230°/230°/220°/220°/210°/200°/190° C. and a rotational speed of 200 rpm, a polypropylene homopolymer (Daplen K2XMOD, with a melt index of 8.0 g/10 minutes at 230° C./2.16 kg, a density of 0.905 g/cc at 20° C.), at a rate of 2.7 kg/h, and a co-continuous blend B (containing 0.95% by weight of bound vinyltriethoxysilane and 55% by weight of gel), at a rate of 1.3 kg/h, are added, homogenized at high deformation speeds, degassed, discharged at a melt temperature of 215° C. and granulated. The resulting heterophasic polyolefin alloy contains 24.5% of gel.

Test pieces, produced according to the instructions of DIN ISO 3167 A by injection molding, have the following properties:

Notch impact strength (Charpy) at −20° C.: 9.5 kJ/m$^2$
Tensile modulus of elasticity: 1320 MPa
Maximum tensile strength ($\sigma_{max}$): 22 MPa
Maximum extensibility ($\epsilon_{max}$): 165%

What is claimed is:

1. A heterophasic polyolefin alloy having a semi-interpenetrating network structure and an outstanding combination of high stiffness, low temperature toughness and a low coefficient of thermal expansion, consisting of
   (a) 65 to 99.6% by weight of propylene polymers,
   (b) 35 to 0.4% by weight of elastomers selected from the group consisting of elastomeric polyolefins and styrene-ethylene-butadiene terpolymers,
   (c) 0.01 to 3 % by weight, based on the sum of propylene polymers and elastomers, of materials selected from the group consisting of stabilizers, processing aids, antistatic agents, pigments and nucleating agents,
   (d) 10 to 70% by weight, based on the sum of the propylene polymers and elastomers, of inorganic and/or organic fillers and/or reinforcing materials,
wherein the heterophasic polyolefin alloy has a gel content of $$G_{HP}=10^{-2}C_B(G_B+N(100-G_B)),$$

wherein
   $G_{HP}$=gel portion of the heterophasic polyolefin alloy in % by weight
   $C_B$=concentration of the co-continuous blend B in the polyolefin alloy in % by weight
   $G_B$=gel portion of the co-continuous blend B in % by weight
   N=post cross linking factor=0.10 to 0.90,
the heterophasic polyolefin alloy being prepared by melt compounding of:
   (A) 60 to 98% by weight of conventional propylene polymers having melt indexes ranging from 0.1 to 50 g/10 minutes at 230° C./2.16 kg and
   (B) 40 to 2% by weight of a co-continuous blend B having 0.1 to 5% by weight of chemical bound, ethylenically unsaturated hydrolyzable organosilane compounds and a gel content of 5 to 60% by weight, wherein the starting components of said silane modified partly crosslinked co-continuous blend are
      B1) 10 to 80% by weight of conventional propylene polymers having melt indexes from 0.1 to 50 g/10 minutes at 230° C./2.16 kg,
      B2) 90 to 20% by weight of elastomers selected from the group consisting of
         B2.1) olefin copolymers of 50 to 95% by weight of ethylene and 50 to 5% by weight of monomers from the group consisting of propylene, α-olefins having 4 to 18 carbon atoms, ethylenically unsaturated carboxylate esters of the vinyl acetate type and $C_1$ to $C_8$ alkyl (meth)acrylates,
         B2.2) largely amorphous polypropylenes or propylene copolymers having a proportion of crystalline polypropylene or crystalline propylene copolymers of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole % of propylene and at most 20 mole % of one or more α-olefins of the general formula $CH_2=CHR$, wherein R is a linear or branched alkyl group having 2 to 8 carbon atoms,
         B2.3) non-isotactic propylene homopolymers having a melt index of 145° to 165° C., a melt viscosity of more than 200,000 cps at 190° C., a heat of crystallization of 4 to 10 cal/g and a portion of 35 to 55% by weight soluble in diethyl ether,
         B2.4) linear styrene ethylene/butadiene-styrene triblock copolymers having an ethylene content of 5 to 45% by weight and a styrene content of 15 to 45% by weight and a melt index of 0.2 to 30 g/10 minutes at 190° C./2.16 kg,
   wherein said co-continuous blend B is prepared by melt kneading of the components B1 and B2 in presence of 0.1 to 5% by weight of ethylenically unsaturated hydrolyzable organosilane compounds, 0.01 to 1% by weight of thermally decomposing free radical forming agents and 0.01 to 1% by weight, in each case based on the elastomer components B2.1 to B2.4, of silanol condensation catalysts.

2. The heterophasic polyolefin alloy of claim 1, wherein the conventional propylene polymers are propylene homopolymers and/or copolymers, which are synthesized using Ziegler-Natta catalysts or metallocene catalysts and consist of propylene, ethylene and/or α-olefins having 4 to 18 carbon atoms and have a propylene content of 80.0 to 99.9% by weight in the form of random copolymers, block copolymers and/or random block copolymers or propylene homopolymers having melt indexes of 0.1 to 50 g/10 minutes at 230° C./2.16 kg.

3. The heterophasic polyolefin alloy of claim 1, wherein the conventional propylene polymers are propylene homopolymers and/or copolymers, which are synthesized using Ziegler-Natta catalysts or metallocene catalysts and consist of propylene, ethylene and/or α-olefins having 4 to 18 carbon atoms and have a propylene content of 80.0 to 99.9% by weight in the form of propylene homopolymers having melt indexes of 0.2 to 15 g/10 minutes at 230° C./2.16 kg.

4. The heterophasic polyolefin alloy of any one of claims 1, 2 or 3, wherein the ethylenically unsaturated, hydrolyzable organosilane compounds present in the co-continuous blend B, are $C_3$ to $C_8$ alkenyl $C_1$ to $C_2$ alkoxy silanes, $C_2$ to $C_{14}$ alkenylhalogensilanes, amino $C_2$ to $C_5$ alkenylsilanes, $C_6$ to $C_8$ cycloalkenylsilanes, methacryloxy $C_1$ to $C_3$ alkylsilanes, styryl $C_1$ to $C_2$ alkoxysilanes, vinyl $C_1$ to $C_4$ alkoxysilanes and/or vinyl $C_1$ to $C_8$ carboxysilanes, vinyltrimethoxysilane and/or vinyltriethoxysilane.

5. A method for producing a heterophasic polyolefin alloy having a semi-interpenetrating network structure and an outstanding combination of high stiffness, low temperature toughness and a low coefficient of thermal expansion, consisting of
   (a) 65 to 99.6% by weight of propylene polymers,
   (b) 35 to 0.4% by weight of elastomers selected from the group consisting of elastomeric polyolefins and styrene-ethylene butadiene terpolymers,
   (c) 0.01 to 3% by weight, based on the sum of propylene polymers and elastomers, of materials selected from the group consisting of stabilizers, processing aids, antistatic agents, pigments and nucleating agents,
   (d) 10 to 70% by weight, based on the sum of propylene polymers and elastomers, of inorganic and/or organic fillers and/or reinforcing materials,
wherein the heterophasic polyolefin alloy has a gel content of $$G_{HP}=10^{-2}C_B(G_B+N(100-G_B)),$$

wherein
   $G_{HP}$=gel portion of the heterophasic polyolefin alloy in % by weight
   $C_B$=concentration of the co-continuous blend B in the polyolefin alloy in % by weight
   $G_B$=gel portion of the co-continuous blend B in % by weight
   N=post cross linking factor=0.10 to 0.90,
is prepared by melt compounding at temperatures of 120 to 270° C. of
   (A) 60 to 98% by eight of conventional propylene polymers having melt indexes ranging from 0.1 to 50 g/10 minutes at 230° C./2.16 kg,
   (B) 40 to 2% by weight of a co-continuous blend B having 0.1 to 5% by weight of ethylenically unsaturated hydrolyzable organosilane compounds and a gel content of 5 to 60% by weight,
   wherein starting components of said silane modified partly crosslinked co-continuous blend are
      B1) 10 to 80% by weight of conventional propylene polymers having melt indexes from 0.1 to 50 g/10 minutes at 230° C./2.16 kg,
      B2) 90 to 20% by weight of elastomers selected from the group consisting of
         B2.1). olefin copolymers of 50 to 95% by weight of ethylene and 50 to 5% by weight of monomers from the group consisting of propylene, α-olefins having 4 to 18 carbon atoms, ethylenically unsaturated carboxylate esters of the vinyl acetate type and $C_1$ to $C_8$ alkyl(meth)acrylates,
         B2.2) largely amorphous polypropylenes or propylene copolymers having a proportion of crystalline polypropylene or crystalline propylene copolymers of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole % of propylene and at most 20 mole % of one or more α-olefins of the general formula $CH_2$=CHR, wherein R is a linear or branched alkyl group having 2 to 8 carbon atoms,
         B2.3) non-isotactic propylene homopolymers having a melt index of 145 to 165° C., a melt viscosity in excess of 200,000 cps at 190° C., a heat of crystallization of 4 to 10 cal/g and a portion of 35 to 55% by weight soluble in diethyl ether,
         B2.4) linear styrene-ethylene/butadiene-styrene triblock copolymers having an ethylene content of 5 to 45% by weight and a styrene content of 15 to 45% by weight and a melt index of 0.2 to 30 g/10 minutes at 190° C./2.16 kg,
         B2.5) mixtures of components and B2.1 to B2.5,
   wherein said co-continuous blend B is prepared by melt kneading of the components B1 and B2 in presence of 0.1 to 5% by weight of ethylenically unsaturated hydrolyzable organosilane compounds, 0.01 to 1% by weight of thermally decomposing free radical forming agents and 0.01 to 1% by weight, in each case based on the elastomer components B2.1 to B2.5 of silanol condensation catalysts, at temperatures of 120 to 270° C., at pressures of 1 to 300 bar and at residence times of 0.5 to 40 minutes,
   wherein 0.01 to 2.5% by weight of stabilizers, 0.01 to 1% by weight of processing aids, 0.1 to 1% by weight of antistatic agents, 0.2 to 3% by weight of pigments, 0.05 to 1% by weight of nucleating agents, 2 to 20% by weight of flame retardants and/or 10 to 70% by weight of fillers and/or reinforcing agents, in each case based on the sum of polymers, are added during the preparation of the co-continuous blend B and/or during the subsequent preparation of the heterophasic polyolefin alloy.

6. The method for producing the heterophasic polyolefin alloy of claim 5, wherein the melt compounding of
   (A) the conventional propylene polymers, and
   (B) the co-continuous blend B is carried out under the continuous addition of the propylene homopolymers or propylene copolymers to the co-continuous blend B at temperatures of 200 to 240° C.

7. The method for producing the heterophasic polyolefin alloy of claim 5, wherein the melt compounding of
   (A) the conventional propylene polymers, and
   (B) the co-continuous blend B is carried out with addition of 0.01 to 0.5% by weight of silanol catalysts and/or 0.01 to 0.5% by weight of water.

8. The method for producing the heterophasic polyolefin alloy of claim 5, wherein the co-continuous blend B is prepared by the reaction of mixtures of 10 to 80% by weight of conventional propylene polymers and 90 to 20% by weight of elastomers selected from the group consisting of elastomeric polyolefins and styrene-ethylene-butadiene terpolymers with 0.1 to 5.0% by weight of ethylenically unsaturated hydrolyzable organosilane compounds in the presence of 0.01 to 1% by weight of thermally decomposing free radical-forming agents having half-life times of 1 minute to 48 hours at 130° C., 0.01 to 1.0% by weight of silanol condensation catalysts and 0.01 to 1.0% by weight of water, in each case based on the elastomers, in continuous kneaders in the melt at temperatures of 120° to 270° C. at residence times of 0.5 to 40 minutes.

9. The method for producing the heterophasic polyolefin alloy of claim 5, wherein the co-continuous blend B is prepared by the reaction of mixtures of 10 to 80% by weight of conventional propylene polymers and 90 to 20% by weight of elastomers selected from the group consisting of elastomeric polyolefins and styrene-ethylene-butadiene terpolymers with 0.1 to 5.0% by weight of ethylenically unsaturated hydrolyzable organosilane compounds in the presence of 0.01 to 1% by weight of thermally decomposing free radical-forming agents having half-life times of 1 minute to 48 hours at 130° C. 0.01 to 1.0% by weight of silanol condensation catalysts and 0.01 to 1.0% by weight of water, in each case based on the elastomers, in continuous kneaders in the melt at temperatures of 200° C. to 240° C. and at pressures of 1 to 30 bar, at residence times of 1 to 15 minutes.

10. The method for producing the heterophasic polyolefin alloy of claim 5, wherein the co-continuous blend B is prepared by the reaction of mixtures of 6 to 66% by weight of conventional propylene polymers and 94 to 34% by weight of elastomers selected from the group consisting of elastomeric polyolefins and styrene-ethylene-butadiene terpolymers with 0.1 to 5.0% by weight of ethylenically unsaturated hydrolyzable organosilane compounds in the presence of 0.01 to 1% by weight, in each case based on the elastomers, of thermally decomposing free radical-forming agents having half-life times of 1 minute to 48 hours at 130° C., and the addition of a further 5 to 40% by weight, based on the polymer mixture, of conventional propylene polymers, and 0.01 to 1.0% by weight of silanol condensation catalysts and 0.01 to 1.0% by weight of water, in each case based on the elastomers, in continuous kneaders in the melt at temperatures of 120° to 270° C. and at pressures of 1 to 300 bar and at residence times of 0.5 to 40 minutes.

11. The method for producing the heterophasic polyolefin alloy of claim 5, wherein the co-continuous blend B is prepared by the reaction of mixtures of 6 to 66% by weight of conventional propylene polymers and 94 to 34% by weight of elastomers selected from the group consisting of elastomeric polyolefins and styrene-ethylene-butadiene terpolymers with 0.1 to 5.0% by weight of ethylenically unsaturated hydrolyzable organosilane compounds in the presence of 0.01 to 1% by weight in each case based on the elastomers, of thermally decomposing free radical-forming agents having half-life times of 1 minute to 48 hours at 130° C., and the addition of a further 5 to 40% by weight, based on the polymer mixture, of conventional propylene polymers, and 0.01 to 1.0% by weight of silanol condensation catalysts and 0.01 to 1.0% by weight of water, in each case based on the elastomers, in continuous kneaders in the melt at temperatures of 200° to 240° C. and at pressures of 1 to 30 bar at residence times of 1 to 15 minutes.

12. The method for producing the heterophasic polyolefin alloy of claim 5, wherein the co-continuous blend B is prepared by the reaction of elastomers selected from the group consisting of elastomeric polyolefins and styrene-ethylene-butadiene terpolymers with 0.1 to 5.0% by weight of ethylenically unsaturated hydrolyzable organosilane compounds in the presence of 0.01 to 1% by weight, in each case based on the elastomers, of thermally decomposing free radical-forming agents having half-life times of 1 minute to 48 hours at 130° C., in continuous kneaders in the melt at temperatures of 120° to 270° C. and at pressures of 1 to 300 bar at residence times of 0.5 to 40 minutes followed by granulation and subsequently by melt compounding of mixtures of 90 to 20% by weight of these modified elastomers and 10 to 80% by weight of conventional propylene polymers in the presence of 0.01 to 1.0% by weight of silanol condensation catalysts and 0.01 to 1.0% by weight of water, in each case based on the elastomers, in continuous kneaders in the melt at temperatures of 120° to 270° C.

13. The method for producing the heterophasic polyolefin alloy of claim 5, wherein the co-continuous blend B is prepared by the reaction of elastomers selected from the group consisting of elastomeric polyolefins and styrene-ethylene-butadiene terpolymers with 0.1 to 5.0% by weight of ethylenically unsaturated hydrolyzable organosilane compounds in the presence of 0.01 to 1% by weight, in each case based on the elastomers, of thermally decomposing free radical-forming agents having half-life times of 1 minute to 48 hours at 130° C., in continuous kneaders in the melt at temperatures of 200° to 240° C. and at pressures of 1 to 30 bar, at residence times of 1 to 15 minutes, followed by granulation and subsequently by melt compounding of mixtures of 90 to 20% weight of these modified elastomers and 10 to 80% by weight of conventional propylene polymers in the presence of 0.01 to 1.0% by weight of silanol condensation catalysts and 0.01 to 1.0 by weight of water, in each case based on the elastomers, in continuous kneaders in the melt at temperatures of 200° C. to 240° C.

14. The method for producing the heterophasic polyolefin alloy of one of claims 5 to claim 13, wherein for the preparation of co-continuous blend B, dicumyl peroxide, cumyl t-butyl peroxide, di-t-butyl peroxide and/or 2,5-dimethyl-2,5-(di-t-butyl peroxy)-hexane are used as thermally decomposing free radical-forming agents.

15. The method for producing the heterophasic polyolefin alloy of one of the claims 5 to 13, wherein as silanol condensation catalysts oxides, hydroxides and/or carboxylic acid salts of the metals tin, titanium, zinc, zirconium, iron, copper and/or lead and tin dilaurate, dibutyl tin dioctoate and/or $C_1$ to $C_{12}$ dialkyl tin oxides are used.

16. The method for producing the heterophasic polyolefin alloy of one of the claims 5 to 13, wherein the preparation of the co-continuous blend B and the subsequent preparation of the heterophasic polyolefin alloy are carried out in an extruder cascade of 2 twin-screw extruders as a continuous kneader, in a first extruder, at mass temperatures of 190° to 250° C., mixtures of propylene polymers, elastomers and ethylenically unsaturated, hydrolyzable organosilane compounds being reacted, the propylene polymers being added to the co-continuous blend B as a side stream and, in the second extruder, the heterophasic polyolefin alloy being produced by homogenizing the co-continuous blend B with an excess of propylene polymers, with the addition of 0.01 to 0.5% by weight of silanol condensation catalysts and/or 0.01 to 0.5% by weight of water, at mass temperatures of 190° to 250° C. at high deformation speeds.

17. The method for producing the heterophasic polyolefin alloy of one of the claims 5 to 13, wherein the preparation of the co-continuous blend B and the subsequent preparation of the heterophasic polyolefin alloy are carried out in a twin-screw extruder having an L/D of 32 to 60 and in a tightly meshing twin-screw extruder, rotating in the same direction, having an L/D of 40 to 60, the reaction of the mixtures of propylene polymers, elastomers, ethylenically unsaturated, hydrolyzable organosilane compounds to the co-continuous blend B being carried out in the first 50 to 75% of the process length of the extruder components and the production of the heterophasic polyolefin alloy by homogenizing the co-continuous blend B with an excess of propylene homopolymers or propylene copolymers A, with side stream addition of the propylene homopolymers or the propylene copolymers A, with the addition of 0.01 to 0.5% by weight of silanol condensation catalysts and/or 0.01 to 0.5% by weight of water, being carried out in the final 25 to 50% of the process length of the extruder components.

18. An article which is a film sheet, fiber, panel, coating, injection molded article, pipe, hollow object or foam comprising the heterophasic alloy of any one of claims 1 to 3.

* * * * *